July 1, 1958  J. A. F. GLASS  2,841,026
NUT SCREW MECHANISMS
Filed May 11, 1955  3 Sheets-Sheet 1

INVENTOR.
BY

July 1, 1958  J. A. F. GLASS  2,841,026
NUT SCREW MECHANISMS
Filed May 11, 1955  3 Sheets-Sheet 2
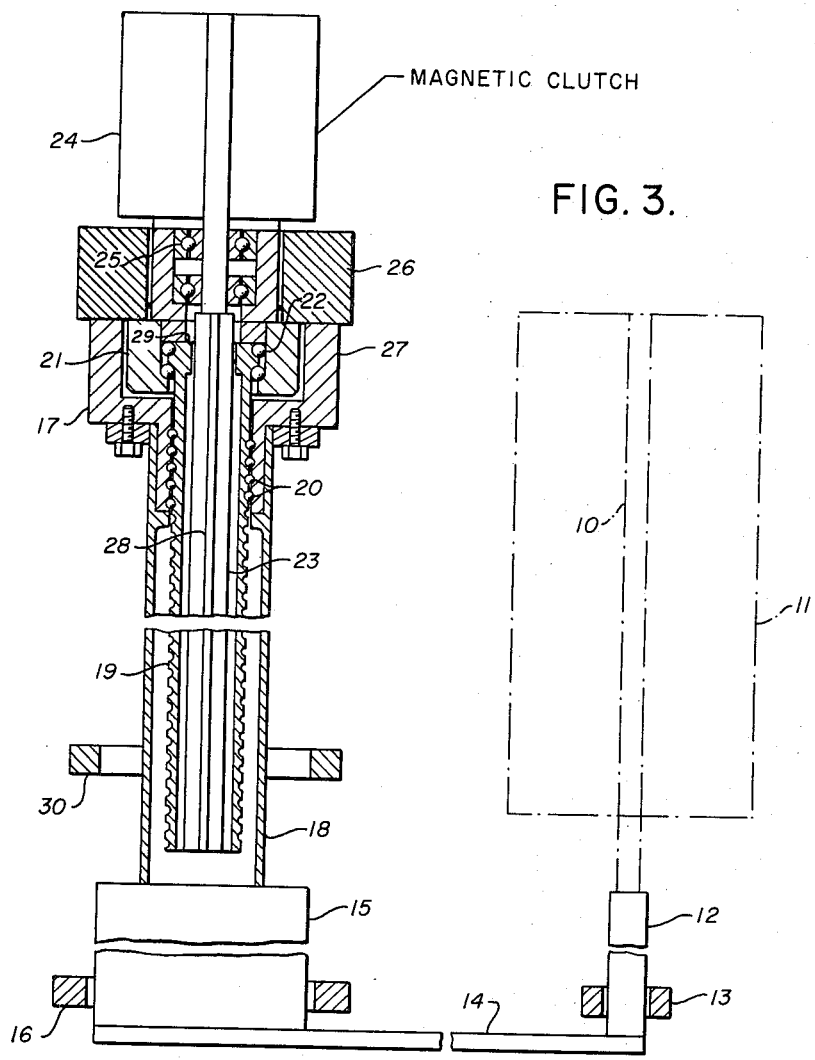
FIG. 3.
FIG. 4.
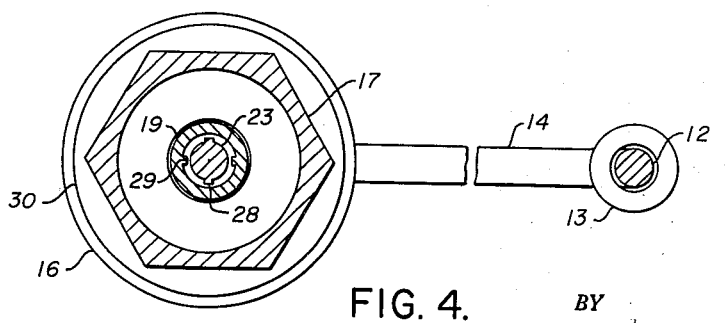
INVENTOR.
BY July 1, 1958 J. A. F. GLASS 2,841,026
NUT SCREW MECHANISMS
Filed May 11, 1955 3 Sheets-Sheet 3

Inventor
JOHN ALEXANDER F. GLASS
By
Attorney

United States Patent Office 2,841,026
Patented July 1, 1958

2,841,026

NUT SCREW MECHANISMS

John Alexander Forbes Glass, Woolton, Liverpool, England, assignor, by mesne assignments, to the United States of America as represented by the United States Atomic Energy Commission Application May 11, 1955, Serial No. 507,525

8 Claims. (Cl. 74—424.8)

This invention relates to nut and screw mechanisms and the invention is described below in its application to reactivity control assemblies for nuclear reactors.

The reactivity of a nuclear reactor can be controlled by the movement into or out from the reactor core of a mass of material, usually in the form of rods, which has the power to alter the reproduction rate of the neutrons. If the material has a high neutron absorption then movement into the core decreases the reactivity and movement out from the core increases the reactivity. If the material is of similar or higher relative fissile content than that of the core then movement into the core increases the reactivity and movement out decreases the reactivity.

Two forms of control are customarily provided. One form of control, which can be referred to as the normal operating control, is required to be adjustable in both directions within fine limits (a few thousandths of an inch) and usually to have a quicker movement (e. g. a factor of ten) in the direction that decreases reactivity than in the direction that increases reactivity. The other form of control, which can be referred to as emergency control and which does not normally require fine adjustment, is required to operate from any point in its travel in a direction of decreasing reactivity as rapidly as possible and with infallibility. The requirements of the normal operating control can be met by suitable gear assemblies. The requirements of emergency control can be met by pneumatic drive in a direction that increases reactivity and by gravity operation in the reverse direction. Pneumatic drive is advantageous in that it can be rapidly stopped and then gravity operation to decrease reactivity immediately takes effect. However, pneumatic operation does not provide a fine control and it is not suitable for use in combination with a liquid metal cooling system for the reactor.

An emergency control assembly that possesses the properties of movement in both directions within fine limits whilst being rapidly releasable from any point in its travel to fall under gravity to decrease reactivity can serve the dual function of operating control and emergency control. The provision of separate normal operating control assemblies and emergency control assemblies has become the more normal practice in nuclear reactor design, probably due mainly to the conflicting requirements of the two forms of control. The combination of operating control and emergency control into one set of control assemblies is attractive however owing to the saving in cost and the simplification in the reactor design. In fact, with small reactor cores consisting largely of fissile fuel and coolant channels with no moderator the problem of accommodating both emergency and normal operating control assemblies in the limited space without interfering with the operation of the reactor becomes acute.

It is a primary object of the present invention to provide a nut and screw mechanism for use in a nuclear reactor control assembly, the mechanism providing fine operation of the assembly for normal operation of the reactor and providing rapid gravity operation in a direction that decreases the reactivity for emergency control.

It is also an object of the invention to provide a nut and screw mechanism suitable for use in a control assembly for a nuclear reactor whereby the assembly can be used to serve the dual function of operating control and emergency control.

It is a further object of the invention to provide a nut and screw mechanism suitable for use in a control assembly for a nuclear reactor wherein the assembly moves in contact with liquid metal used to cool the reactor.

The nut and screw mechanism of the invention comprises a nut member engaging a screw member, a shaft for rotating one of said members, means preventing rotation of the other member whilst permitting free axial movement of both said members together in a direction along said shaft, stops for limiting the axial movement of said members in both directions and a releasable catch arranged to hold the rotatable one of the members at one of its end stops against a force tending to move it towards its other stop.

A nut and screw arrangement embodying the invention is now described with reference to the accompanying drawings wherein:

Figs. 1, 2 and 3 are diagrammatic figures in sectional elevation.

Fig. 4 is a sectional plan view of Fig. 3.

Figures 1, 2:
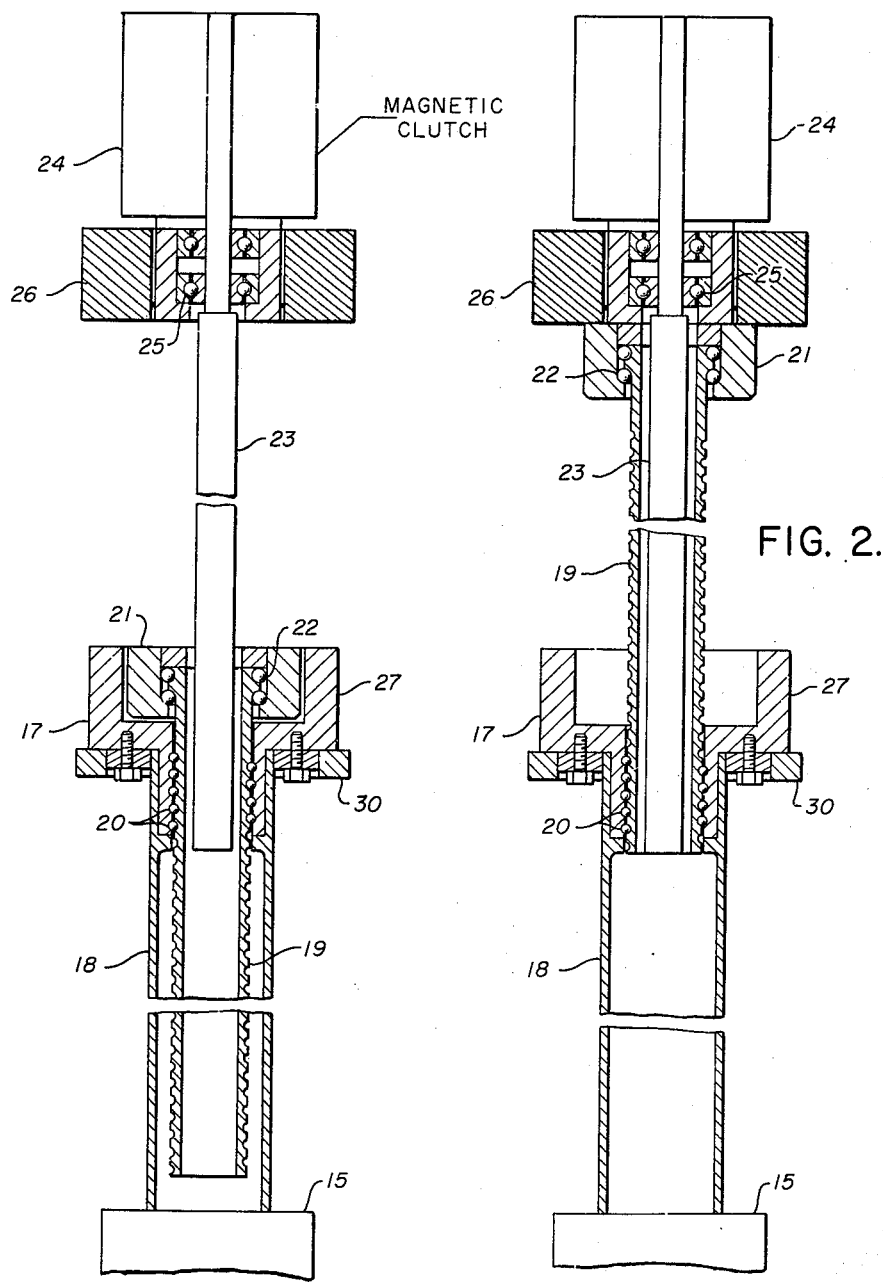

Figs. 1, 2 and 3 show the three principal positions of a nuclear reactor control assembly operated by a nut and screw mechanism according to the invention. Control is effected by the lowering and raising of a fissile element 10, in a reactor core 11 (Fig. 3). The fissile element 10 is connected with a rod 12 in a guide 13. The rod 12 has a cross-arm 14 connecting with a tube 15 in a guide 16. The tube 15 is attached to the nut 17 of a nut and screw mechanism by a tubular part 18. The nut 17 is associated with a screw 19 by a ball screw connection, the threads of the nut 17 and screw 19 forming a continuous spiral passage through which balls 20 circulate. The screw 19 is provided with a rotary head consisting of a collar 21 and ball races 22. A shaft 23 driven through a magnetic clutch 24 by a drive motor 51 is supported in a bearing 25. A magnet 26 is provided to hold the collar 21 and hence hold the screw 19 at one end of its travel, the ball race 22 permitting rotation in both directions once the nut 17 is away from its stop. The nut 17 is provided with a fixed head 27 which can also be held by the magnet 26.

In Fig. 4 the shaft 23 has splines 28 and the screw 19 has splines 29 so that when the shaft rotates the screw rotates but the screw is free for axial movement. The nut 17, shown hexagonal in shape to emphasize its function, is prevented from rotating by its connection with the rod 12 held in the guide 13. The nut has free axial movement together with the screw it engages. Movement in the upward direction is limited by the magnet 26 and in the lower direction by stop 30 (Fig. 3).

The operation of the mechanism is now described commencing at Fig. 1. The tube 15, and hence the arms 14, rod 12 and element 10, are at the lowest position; that is, the element 10 is withdrawn from the core 11 and reactivity is low. As the shaft 23 is rotated, the screw 19 rotates and rises in the nut 17 which remains on the stop 30. Eventually the position shown in Fig. 2 is reached and the screw 19 is held via its collar 21 and the magnet 26. No further rotation of the shaft 23 can take place in the same direction as the nut 17 is against its stop 30 and slip is taken at the clutch 24. At this point the direction of rotation of shaft 23 is reversed by reversing drive motor 51 by manual control and as the screw 19 is held by the magnet 26 the nut begins to rise up the screw and inserts the element 10 in the core 11 so that the reactivity of the reactor increases. Then the position in Fig. 3 is reached, the head 27 of the nut 17 is also held by the magnet 26, and the element 10 is fully inserted.

Operating control of the reactor is achieved by driving the nut via the shaft 23 and screw 19 in either direction through the magnetic clutch 24. The screw 19 remains held at its upper level but transmits movement to the nut 17 by reason of its rotation on the rotary head and the couplings provided by balls 20. Emergency control is achieved at any position of the nut, and whilst a drive is or is not taking place, merely by de-energising the magnet 26, when the collar 21 is released and nut and screw fall under gravity to the stops 30. The fissile element 10 is withdrawn from the reactor as the nut and screw fall and the reactor shuts down.

Figure 5:
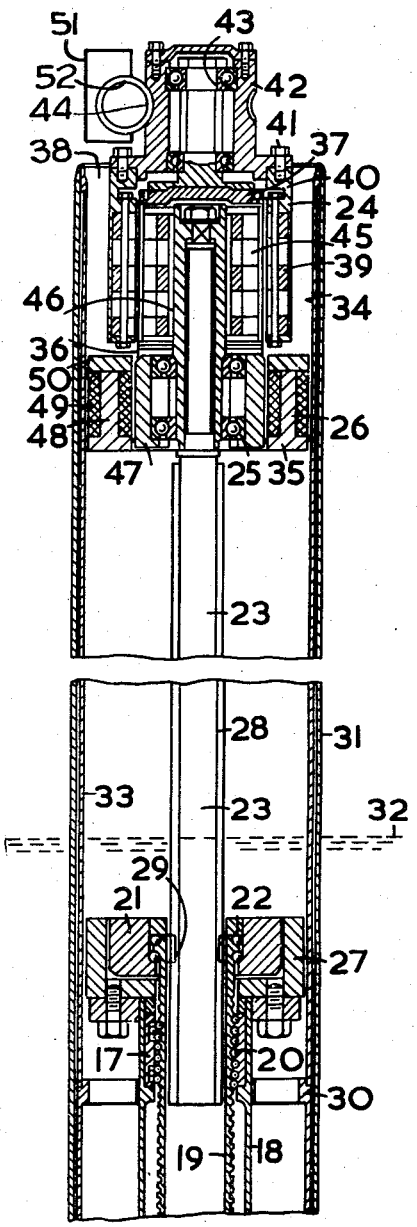
Fig. 5 is a sectional elevation.

In Fig. 5 the main components are identified by the same numerals as used in Figs. 1 to 4, viz., nut 17, tubular part 18, screw 19, balls 20, collar 21, ball races 22, shaft 23, magnetic clutch 24, bearing 25, holding magnet 26, fixed head 27, splines 28 and 29, and stop 30.

The control assembly is supported in a structural tube 31 which dips into liquid metal shown at the level 32. The assembly has a liner 33 fitting in the tube 31 and the liner 33 has welded to it the stop 30, a sleeve 34 and a ring 35 of soft iron. The ring 35 also has welded to it a bearing support 47 and the support 47 is welded to a diaphragm 36 which is closed by a top plate 37 so that there is formed an annular well 38. Stacked rings of permanent magnets 39 are rotatable in the well 38. The magnets 39 are held in a frame 40 supported by bolts 41 from a head 42. The head 42 is carried on bearings 43 and is provided with an annular screw 44 for coupling with a worm drive 52 of the drive motor 51. The components numbered from 39 to 44 form one part of the magnetic clutch 24. The other part of the clutch 24 is inside the diaphragm 36 and consists of stacked rings of permanent magnets 45 mounted in a frame 46 keyed to the shaft 23 so that a drive to the shaft 23 is provided by magnetic coupling between magnets 39 and 45, the magnetic flux traversing the diaphragm 36.

The soft iron ring 35 has a web portion 48 which is split to provide four pole pieces. Over each of these pole pieces coils 49 are placed and surmounted by another soft iron ring 50. The components numbered 35 and 48 to 50 form the holding magnet 26.

I claim:

1. A nut and screw mechanism comprising a nut member engaging a screw member, a shaft for rotating one of said members, means preventing rotation of the other member whilst permitting free axial movement of both said members together in a direction along the shaft, stops for limiting the axial movement of said members in both directions and a releasable catch arranged to hold the rotatable one of the members at one of its end stops against a force tending to move it towards its other stop.

2. A nut and screw mechanism comprising a nut member engaging a screw member said members being limited in their axial movements by stops, means for applying a rotation free of axial restraint except at its stops to one of said members, means restraining rotation of the other of said members whilst allowing axial movement except at its stops, and a releasable catch at one of the stops of the rotatable member restraining the axial movement of the rotatable member whilst permitting it to continue rotating.

3. A nut or screw mechanism comprising a nut member engaging a screw member and means for rotating one of said members arranged so that the axial movement of the non-rotated member is provided by first rotating the rotary one of said members to a stop holding the rotary member at the stop against axial movement whilst allowing its rotation in forward and reverse directions to move the non-rotated member and means permitting the free axial movement of both members away from said stop on releasing the hold of the rotary member at the stop.

4. A nut and screw mechanism comprising an outer nut member engaging an inner screw member and a coaxial inner shaft adapted to rotate the screw member whilst permitting free axial movement of the screw member along the shaft, means restraining rotation of the nut member whilst permitting its free axial movement with the screw member, stops defining the limits of axial movement of both members and a releasable catch for the screw member arranged to hold the screw member against axial movement at one of its stops whilst permitting its rotation in forward and reverse directions.

5. A nut and screw mechanism as claimed in claim 4 wherein said shaft includes a magnetic coupling permitting continued drive of the shaft when the screw member and nut member are against opposite stops.

6. A nut and screw mechanism as claimed in claim 5 wherein said magnetic drive includes a diaphragm between driving and driven members sealed to enclose the nut, screw and driven members.

7. A nut and screw mechanism as claimed in claim 4 wherein said releasable catch comprises an electromagnet co-operating with a pole piece associated with the screw member via a bearing arranged so that the pole piece can be latched with the electromagnetic whilst supporting the screw member and permitting its rotation.

8. A nut and screw mechanism as claimed in claim 7 wherein the nut member has a pole piece adapted to engage the electromagnet.

References Cited in the file of this patent

UNITED STATES PATENTS

| | | |
|---|---|---|
| 924,122 | Williams | June 8, 1909 |
| 1,017,619 | Callan | Feb. 13, 1912 |
| 1,635,068 | Bing | July 5, 1927 |
| 2,276,195 | Holmes | Mar. 10, 1942 |
| 2,387,800 | Leland et al. | Oct. 30, 1945 |
| 2,642,752 | Geyer et al. | June 23, 1953 |